UNITED STATES PATENT OFFICE 2,110,187

METHOD OF TREATING CHROME LIQUORS

Dudley A. Willams, Providence, R. I.

No Drawing. Application August 23, 1933,
Serial No. 686,475

12 Claims. (Cl. 23—56)

This invention relates to the recovery of chromium content of dilute waste liquors, such as are obtained in the tanning industry, and to the formation of a comparatively unobjectionable and readily disposable residue.

In the industry of chrome tanning leather, large quantities of spent tan liquors are produced from the tanning paddles or drums which are useless for tanning purposes and are at present thrown away. In large scale operations such liquors constitute a serious problem of disposal because they contain not only troublesome accumulations of finely divided solids but also dissolved tanning reagents which are harmful to life and vegetation and may likewise give rise to objectionable odors in the streams or other natural bodies of water into which the tanning effluents are discharged. At the same time, these liquors contain reagent materials which represent a considerable monetary value in respect of the dissolved salts which they contain. It is not economically possible to resort to evaporation of the liquors for the recovery of these salts. The solutions are too dilute and too much contaminated to permit of re-use of the waste liquors. Consequently the problem of disposal is solved as well as may be in each locality in which any given tannery is located, though this leads to recurring controversies in the civic relationships of the industry.

It is therefore an object of this invention to provide a method for the economical treatment of such tannery waste liquors and to recover the reagent materials which they contain in useful form. It is also an object to leave the liquor from which the reagents have been extracted in an unobjectionable condition from the standpoint of stream pollution. It is a further object to obtain the recovered reagent materials in a form convenient for use in the tanning operation itself or for associated purposes, and thus reduce the amounts which it is necessary to purchase. Other objects will appear from the following disclosure.

Spent chrome tan liquors, as obtained from the tanning operation, contain scraps of hide, finely divided hide substance, more or less insoluble organic matter, and, in solution, soluble organic salts and some other inorganic salts such as sodium sulphate, chloride, etc., but principally chromium salts which are largely in the form of chromic sulphate. The chromium may also be present in solutions to which this invention is applicable in the form of soluble chromites, chromates and dichromates.

Such solutions are difficult to filter, but it is usually desirable to remove the larger scraps of hide, hide substance, etc., and this may be done by straining through a wire screen or cloth.

If the liquor contains appreciable proportions of chromates or dichromates, it is next treated to convert them to soluble chromic salts. This may be effected by treating with a reducing agent. For this purpose alkali sulphites or bisulphites, thio-sulphates or other common reducing agents such as sulphur dioxide, etc., may be used. If chromites are present, they may be taken up in the subsequent treatments hereinafter to be described, and likewise converted to soluble chromic salts. Chromic chloride may be converted to the sulphate by treating with a soluble sulphate or with sulphuric acid and expelling the liberated hydrochloric acid by heating. The solution may then be treated the same as other chromic sulphate solutions.

The liquor, whether it contains primarily chromic salts or whether it has been treated to reduce chromates or dichromates, etc., as above described, will usually be sufficiently acidic to retain the chromic salts in solution. If not it may be desirable to add a suitable mineral acid thereto such as sulphuric acid. An excess or unnecessary addition of acid, however, is to be avoided. Since the liquors are usually initially acidic and contain chromic sulphate in large proportions, in respect of their dissolved contents, they may be treated without such preliminary reduction and without any addition of free acid. In either case, the liquor is next subjected to agitation and a neutralizing agent is added slowly. The neutralizing agent may consist of a soluble alkaline reacting compound, such as alkali hydroxides or an alkaline salt, preferably of a volatile acid such as sodium sulphide, or carbonate or bicarbonate, or disodium or trisodium phosphate. Ammonium hydroxide and corresponding ammonium salts may also be used. Less soluble alkaline compounds may also be used as neutralizing or precipitating agents, such as the alkaline earth metal compounds, calcium sulphide, hydroxide, carbonate, etc. But certain barium compounds may be on the whole too insoluble for satisfactory results. With the alkaline earth metal reagents, the reaction is facilitated or hastened by heating or boiling the solution after they have been added, whereupon the alkaline earth metal is precipitated as a relatively insoluble sulphate. Magnesium compounds react similarly to the other alkaline earths, but the resulting sulphate remains in solution. When the salts of volatile acids are employed, the acid radical may be effectively removed by boiling the reaction mixture after their addition.

The addition of the neutralizing and precipitating reagent is made slowly and preferably without introducing an unnecessary excess. By so doing, as neutrality is approached the soluble chromium salt is converted to the greenish blue insoluble chromium hydroxide which precipitates as a flocculent mass, leaving a comparatively clear supernatant solution.

Owing to the gelatinous condition of the precipitate thus formed, it separates and carries down with it the suspended solids contained in the tanning liquor. The precipitated hydrate may also be mixed with other precipitates, such as those formed by the addition of alkaline earth metal precipitating reagents, as a result of the reaction. For example, the alkaline earth metal compounds, such as the hydroxide, carbonate, sulphide etc., react to precipitate relatively insoluble sulphates and these are intermingled with and assist in materially accelerating the rapid settling of the chromium hydroxide. Excess of the alkaline earth metal reagent is not harmful, but may be undersirable from the standpoint of reacting with and hence requiring the use of an excessive amount of acid in the next step as hereinafter described.

A convenient source of a suitable alkaline earth metal compound is found in the waste limes or liming liquors which may be obtained from the tannery operation of liming hides. These may be quite impure, but apart from screening to separate hairs, particles of hide, etc., are suitable for direct use in the present operation in accordance with this invention, which affords a convenient mode of disposing of them.

The presence of unprecipitated chromium salt remaining in solution may be detected by a green coloration after the precipitate has settled out. A sufficient quantity of the precipitating reagent should be added to effect complete precipitation of the chromium content, leaving a colorless supernatant solution.

The reaction mixture is then allowed to cool, if heated, and to settle. The supernatant liquid is clear and is comparatively pure aqueous solution of alkali (or magnesium) sulphate. It is decanted and may be passed to waste, while the precipitate is washed with fresh wash waters. The first supernatant liquor may in some instances (e. g., when ammonium salts are used) be withdrawn for re-use or recovery of any contained reagents therein, but the subsequent wash waters (which will be considerably less in volume) may be discarded.

The precipitates containing alkaline earth metal salts separate more rapidly than the more voluminous precipitate of chromium hydroxide. In washing the former, more rapid and more complete separation of successive wash waters may be effected; but with the reduction or removal of the alkaline earth metal salt (e. g., calcium or magnesium sulphate) in the wash waters, the precipitate becomes more gelatinous and settles less rapidly and less completely. In the case of magnesium carbonate as the precipitating reagent, residual carbonate and resulting sulphate may be removed by washing with water to which a small amount of ammonium hydroxide and/or ammonium chloride may be added, selectively to dissolve and remove the magnesium compounds from the chromium hydroxide.

The washed precipitate may be separated from its wash waters by decantation or other aids to rapid separation. With the alkali metal, ammonium and magnesium precipitating reagents, any excess of the reagent as well as by-products of the reaction will be dissolved and readily separated from the chromium hydroxide. With the alkaline earth metal precipitating reagents relatively insoluble sulphates will be occluded and carbonates also may be occluded with the precipitated chromium hydroxide. These, however, have the effect of promoting more rapid and complete settling and separating, as well as facilitating the washing operations.

The precipitate obtained by any of the foregoing procedures is next treated with relatively concentrated sulphuric acid (or hydrochloric acid) whereupon the chromium hydroxide is dissolved. If the alkaline earth metals are present other than as sulphate they will be converted to insoluble sulphates and volatile acids such as hydrogen sulphide, carbonic acid, and sulphur dioxide, may be expelled by heating to boiling. The chromium will be converted to chromic sulphate and form a relatively concentrated solution or, if alkali metals such as sodium, potassium, etc., are added in correct amounts, to the corresponding chrome alum.

In this form or by treating the chromium hydroxide with a concentrated solution of alkali, such as caustic soda to form sodium chromite, the chromium content is separated from insoluble residues and is suitable for use in such form, for those purposes to which it may be applicable, or may be further concentrated, or may be crystalized out by evaporation.

The insoluble residues from the acid treatment may consist of tannery waste matter or these may be mixed with alkaline earth metal precipitates such as calcium sulphate, etc. Ordinarily these may be discarded or burned, with or without recovery of the inorganic matter. The waste liquor also, as indicated above, may in some instances contain reagents of value but ordinarily will be discharged into the effluent tannery waste liquors. But, in the condition in which it is released from the present process, it is comparatively harmless and unobjectionable since it will be a comparatively clear water solution containing primarily a soluble alkali sulphate with possibly some chlorides, relatively dilute, and more or less resembling sea water in composition.

Reducing gases may be used to reduce chromates or dichromates, if present, as above described or to reduce fresh quantities of dichromate according to usual practice employed in the preparation of chrome alum solutions from dichromates in which form it is ordinarily purchased on the market.

For some purposes, the precipitated chromium hydroxide, either per se, or in admixture with the associated precipitated salts,—such as calcium sulphate, etc., may find use as a pigment or like coloring compound. In such cases the precipitate will be washed free from soluble matter and may be dried or calcined, with access of air to burn off and remove the organic matter. The white salts will serve as a binder and also as a colorless diluent.

I claim:

1. Method for the recovery of the chromium content of chrome tan liquors containing chromium and organic solid matter, together with soluble sulphate and in dilute aqueous solution, substantially all of the chromium being combined in trivalent form, comprising as steps partially to completely neutralizing the same with a compound selected from a group consisting of carbonates, hydroxides and sulphides of barium, calcium, and strontium to precipitate chromium hydroxide, separating the resulting precipitate from the supernatant aqueous solution, and selectively dissolving the precipitated chromium hydroxide with a solvent selected from a group consisting of sulphuric acid, hydrochloric acid and alkali.

2. Method for the recovery of the chromium content of chrome tan liquors containing chromium and organic solid matter, together with soluble sulphate and in dilute aqueous solution, substantially all of the chromium being combined in trivalent form, comprising as steps partially to completely neutralizing the same with a compound selected from a group consisting of carbonates, hydroxides and sulphides of barium, calcium and strontium to precipitate chromium hydroxide, separating the resulting precipitate from the supernatant aqueous solution, and selectively dissolving the precipitated chromium hydroxide with sulphuric acid.

3. Method for the recovery of the chromium content of chrome tan liquors containing chromium and organic solid matter, together with soluble sulphate and in dilute aqueous solution, substantially all of the chromium being combined in trivalent form, comprising as steps partially to completely neutralizing the same with a compound selected from a group consisting of carbonates, hydroxides and sulphides of barium, calcium, and strontium to precipitate chromium hydroxide, separating the resulting precipitate from the supernatant aqueous solution, and selectively dissolving the precipitated chromium hydroxide with hydrochloric acid.

4. Method for the recovery of the chromium content of chrome tan liquors containing chromium and organic solid matter, together with soluble sulphate and in dilute aqueous solution, substantially all of the chromium being combined in trivalent form, comprising as steps partially to completely neutralizing the same with a compound selected from a group consisting of carbonates, hydroxides and sulphides of barium, calcium, and strontium to precipitate chromium hydroxide, separating the resulting precipitate from the supernatant aqueous solution, and selectively dissolving the precipitated chromium hydroxide with an alkali.

5. Method for the recovery of the chromium content of chrome tan liquors containing chromium and organic soild matter, together with soluble sulphate and in dilute aqueous solution, substantially all of the chromium being combined in trivalent form, comprising as steps partially to completely neutralizing the same with a compound selected from a group consisting of carbonate, hydroxide and sulphide of calcium to precipitate chromium hydroxide, separating the resulting precipitate from the supernatant aqueous solution, and selectively dissolving the precipitated chromium hydroxide with a solvent selected from a group consisting of sulphuric acid, hydrochloric acid and alkali.

6. Method for the recovery of the chromium content of chrome tan liquors containing chromium and organic solid matter, together with soluble sulphate and in dilute aqueous solution, substantially all of the chromium being combined in trivalent form, comprising as steps partially to completely neutralizing the same with a compound selected from a group consisting of carbonate, hydroxide and sulphide of calcium, to precipitate chromium hydroxide, separating the resulting precipitate from the supernatant aqueous solution, and selectively dissolving the precipitated chromium hydroxide with sulphuric acid.

7. Method for the recovery of the chromium content of chrome tan liquors containing chromium and organic solid matter, together with soluble sulphate and in dilute aqueous solution, substantially all of the chromium being combined in trivalent form, comprising as steps partially to completely neutralizing the same with a compound selected from a group consisting of carbonate, hydroxide and sulphide of calcium to precipitate chromium hydroxide, separating the resulting precipitate from the supernatant aqueous solution, and selectively dissolving the precipitated chromium hydroxide with hydrochloric acid.

8. Method for the recovery of the chromium content of chrome tan liquors containing chromium and organic solid matter, together with soluble sulphate and in dilute aqueous solution, substantially all of the chromium being combined in trivalent form, comprising as steps partially to completely neutralizing the same with a compound selected from a group consisting of carbonate, hydroxide and sulphide of calcium to precipitate chromium hydroxide, separating the resulting precipitate from the supernatant aqueous solution, and selectively dissolving the precipitated chromium hydroxide with an alkali.

9. Method for the recovery of the chromium content of chrome tan liquors containing chromium and organic solid matter, together with soluble sulphate and in dilute aqueous solution, substantially all of the chromium being combined in trivalent form, comprising as steps partially to completely neutralizing the same with calcium hydroxide to precipitate chromium hydroxide, separating the resulting precipitate from the supernatant aqueous solution, and selectively dissolving the precipitated chromium hydroxide with a solvent selected from a group consisting of sulphuric acid, hydrochloric acid and alkali.

10. Method for the recovery of the chromium content of chrome tan liquors containing chromium and organic solid matter, together with soluble sulphate and in dilute aqueous solution, substantially all of the chromium being combined in trivalent form, comprising as steps partially to completely neutralizing the same with calcium carbonate to precipitate chromium hydroxide, separating the resulting precipitate from the supernatant aqueous solution, and selectively dissolving the precipitated chromium hydroxide with a solvent selected from a group consisting of sulphuric acid, hydrochloric acid and alkali.

11. Method for the recovery of the chromium content of chrome tan liquors containing chromium and organic solid matter, together with soluble sulphate and in dilute aqueous solution, substantially all of the chromium being combined in trivalent form comprising as steps partially to completely neutralizing the same with calcium sulphide to precipitate chromium hydroxide, separating the resulting precipitate from the supernatant aqueous solution, and selectively dissolving the precipitated chromium hydroxide with a solvent selected from a group consisting of sulphuric acid, hydrochloric acid and alkali.

12. Method for the recovery of the chromium content of chrome tan liquors, containing organic solid matter, together with soluble sulphate and in dilute aqueous solution, comprising as steps reducing the chromium to trivalent condition, partially to completely neutralizing with a compound selected from a group consisting of carbonates, hydroxides and sulphides of barium, calcium, and strontium to precipitate chromium hydroxide, separating the resulting precipitate from the supernatant aqueous solution, and selectively dissolving the precipitated chromium hydroxide with a solvent selected from a group consisting of sulphuric acid, hydrochloric acid and alkali.

DUDLEY A. WILLIAMS.